INVENTORS
LOUIS AGNERAY
ARLETTE CLAYER
MAURICE BRUNI

United States Patent Office 3,553,937
Patented Jan. 12, 1971

3,553,937
METHOD OF CONTINUOUS SEPARATION BY COUNTERCURRENT ABSORPTION IN GASEOUS PHASE
Louis Agneray, Noisy-le-Sec, Arlette Clayer, Ville-d'Avray, and Maurice Bruni, Vaujours, France, assignors to Societe de Recherches Techniques et Industrielles (S.R.T.I.), Boulogne, France
Filed Jan. 26, 1968, Ser. No. 701,002
Claims priority, application France, Jan. 31, 1967, 93,276
Int. Cl. B01d 15/08, 53/08
U.S. Cl. 55—60                                     7 Claims

ABSTRACT OF THE DISCLOSURE

A method of continuous separation of the constituents of a gaseous mixture whereby the constituents are absorbed by a liquid with which a granular solid is impregnated and thus serves as a support for said liquid. The impregnated solid is circulated within a chromatographic separating column countercurrent to the gaseous mixture to be analyzed which is introduced at an intermediate point of said column, said impregnated solid being passed successively through a depletion zone, an enrichment zone, a desorption zone and a purge zone. Only the gaseous mixture to be separated and the granular solid are passed through the column, the desorption of the most strongly absorbed constituents being carried out in the desorption zone by heating and completed in the purge zone, a desorption zone and a purge zone. Only the gaseare the least strongly absorbed. The fraction of the most strongly absorbed constituents which has been desorbed in the purge zone and the fraction of the least strongly absorbed constituents which has served to desorb the most strongly absorbed constituents in the purge zone are recycled to the inlet. The most strongly absorbed constituents are drawn-off at the top of the absorption zone and the least strongly absorbed constituents are drawn-off at the top of the depletion zone.

---

This invention relates to a method of continuous separation of a gaseous mixture into its various constituents by countercurrent absorption in gaseous phase into a liquid with which a solid support is impregnated.

It is known to separate a gaseous mixture into its different constituents by countercurrent adsorption on a granular solid, this process being referred-to as "hypersorption." The gaseous constituents which exhibit the greatest affinity for the adsorbent are preferentially adsorbed on compounds which have a lesser degree of affinity for the solid. The most strongly adsorbable constituents are desorbed at the bottom of the column by a displacement gas or alternatively by heating whilst the least strongly adsorbed constituents are collected at the top of the column.

The process of hypersorption makes it possible to separate substances having a fairly marked adsorption difference such as, for example, ethylene with respect to methane. On the other hand, it is necessary either to heat to a high temperature or to introduce a highly active displacement gas such as water in order that a granular solid such as an adsorbent should be correctly desorbed.

It is also known to separate the constituents of a gaseous mixture by countercurrent adsorption into an impregnated granular solid. The separation is carried out in a chromatographic column in which the gaseous mixture to be separated is introduced at an intermediate point of the column. The most strongly absorbed constituents are collected at the bottom of the column whilst the least strongly absorbed constituents are collected at the top of the column. However, the methods of separation by countercurrent absorption have the disadvantage of employing a carrier gas which is circulated through the entire column and which transports on the one hand the less absorbed constituents towards the top of the column and, on the other hand, desorbs the more strongly absorbed constituents in the desorption zone. The circulation of a carrier gas within the column reduces the capacity of this latter to an appreciable extent and has a further disadvantage in that it is necessary to separate the gas from the constituents which are collected at both ends of the column.

The method of continuous separation of the constituents of a gaseous mixture in accordance with the invention is characterized in that the separation process is carried out by adsorption of the constituents by a liquid with which a granular solid is impregnated and serves as a support for said liquid, said impregnated solid being circulated within a column countercurrent to the gaseous mixture to be analyzed which is introduced at an intermediate point of said column, said impregnated solid being passed successively through a depletion zone, an enrichment zone, a desorption zone and a purge zone, solely the gaseous mixture to be separated and the granular solid being passed through the column, the desorption of the most strongly absorbed constituents being carried out in the desorption zone by heating and completed in the purge zone by elution by a fraction of the constituents which are the least strongly absorbed, the fraction of the most strongly absorbed constituents which has been desorbed in the purge zone and the fraction of the least strongly absorbed constituents which has served to desorb the most strongly absorbed constituents in the purge zone being recycled to the inlet, that the most strongly absorbed constituents are drawn-off at the top of the desorption zone and the least strongly absorbed constituents are drawn-off at the top of the depletion zone.

The impregnated granular solid is displaced in the column at a rate such that the gas reflux generated by heating in the desorption zone does not result in fluidization in any part of the column and in particular in the desorption zone or in the depletion zone which is located above the point of introduction of the gaseous mixture to be separated. By modifying the reflux of the gases within the column, that is to say by modifying the rate of displacement of the solid, the degree of purity of the substances obtained at the top of the depletion zone or at the bottom of the enrichment zone is accordingly modified.

If the gaseous mixture contains $n$ constituents and if it is desired to separate said $n$ constituents, and assuming further that the liquid phase has a progressively increasing absorption capacity from the first to the $n$th constituent, the method is essentially characterized in that said mixture is continuously fed in at an intermediate point of a column which is filled with an impregnated granular solid, said solid being displaced within said column counter-current to the gas and passed through the depletion, enrichment, desorption and purge zones, that the $n$th constituent or in other words the most strongly absorbed constituent is collected at the top of a first desorption zone located at the lower end of the column and that the constituent of the order ($n-1$) is collected in a second desorption zone located above a first depletion zone, that a fraction of the constituent of the order ($n-1$) is withdrawn together with the other constituents of the gaseous mixture at a point of the column which is located at a level below the point of withdrawal of the constituent of the order ($n-1$) and then reintroduced at a level above said withdrawal point at which is carried out the separation between the ($n-1$) constituent which is carried downwards and the other constituents which migrate upwards, that the constituent of the order ($n-2$) is recovered at a point located above the level at which the gases collected in the depletion zone have been reintroduced, that the operations of withdrawal and collection of the partially separated gases are repeated a number of times corresponding to the number of constituents to be separated, that the least strongly absorbed constituent of the gaseous mixture is recovered from the uppermost portion of the last depletion zone, that the desorption of the most strongly absorbed constituent is completed in the purge zone by a fraction of the least strongly absorbed constituent which is recycled to the inlet.

A better understanding of the invention will be gained from the following description, reference being made to the accompanying figures, in which.

Figure 1:
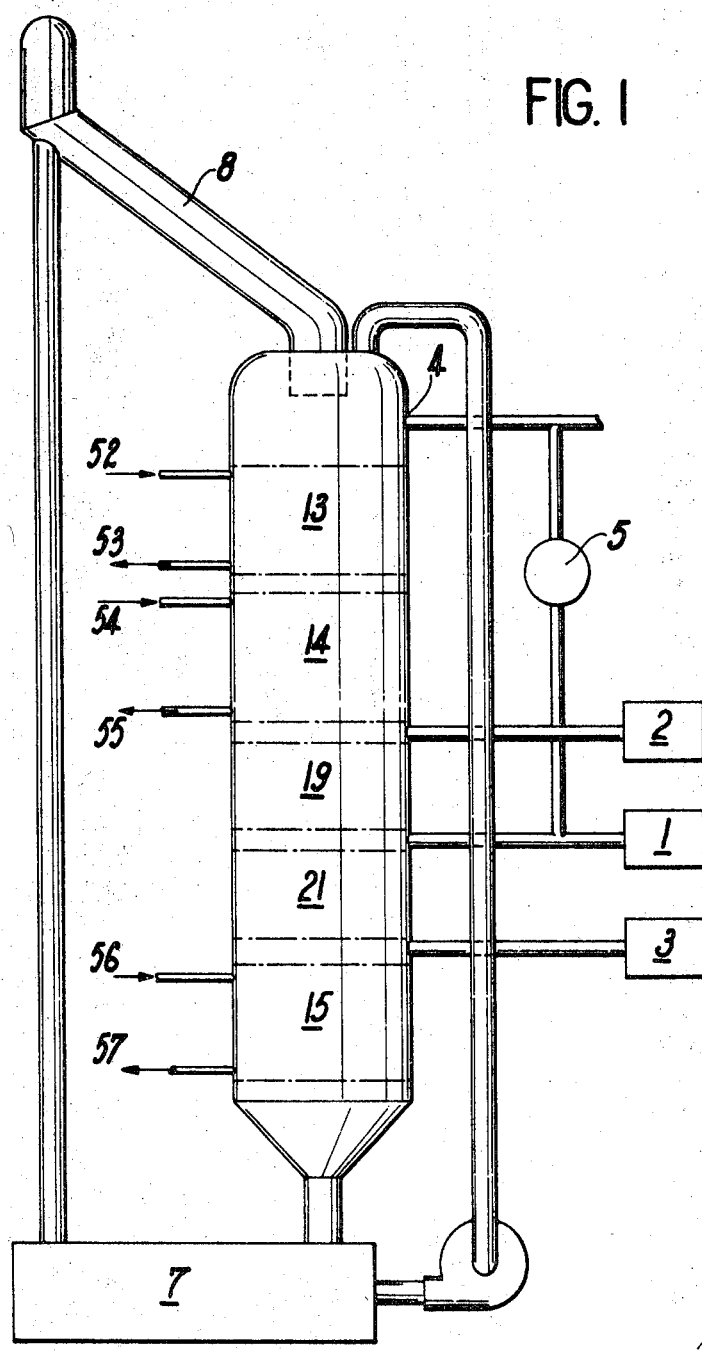
FIG. 1 is a general arrangement diagram of a plant for the separation of a gaseous mixture into two components.

The device for the introduction of the gaseous mixture which is to be separated into one or a number of constituents is designated by the reference 1. Said device comprises, for example, a separator in the case in which the mixture to be processed consists of a vaporizable liquid, a relief-value or a compressor.

The devices for the recovery of the most strongly absorbed constituents 3 and less strongly absorbed or absorbed constituents 2 consist, for example, of condensers or relief valves.

The solid which is constituted by a support impregnated with a liquid is displaced continuously within the column at a velocity which is determined by a flow regulator 7. The solid which is discharged at the lower end of the column is fed back continuously to the top of the column. Transport of the solid can be carried out by means of a helical screw system or by means of a pneumatic transport system.

The separation column can be divided into five zones, viz:

a depletion zone 19 in which the most readily absorbable constituents are retained by the liquid phase with which the solid is impregnated, an enrichment zone 21 in which the different constituents of the mixture are separated, a desorption zone 15 in which the most strongly absorbed constituents are desorbed, a purge zone 13 in which the most readily absorbable constituents are eluted by a fraction of the least strongly absorbed constituents, a cooling zone 14 which serves to reduce the temperature of the impregnated solid to the value which it must have at the top of the depletion zone.

The purge zone 13 and desorption zone 15 are heated by a heating fluid which is admitted respectively at 52 and 56 and discharged respectively at 53 and 57. The cooling zone 14 is cooled by a cooling fluid which is admitted at 54 and discharged at 55.

The measuring section mainly comprises measurements of pressure and temperature within the column as well as measurements of gas flow.

The operation is carried out by regulating the flow of the solid, the temperature profile in the depletion zone, the quantity of heat delivered into the desorption section and the rates of introduction and withdrawal of the gases.

Figure 2:
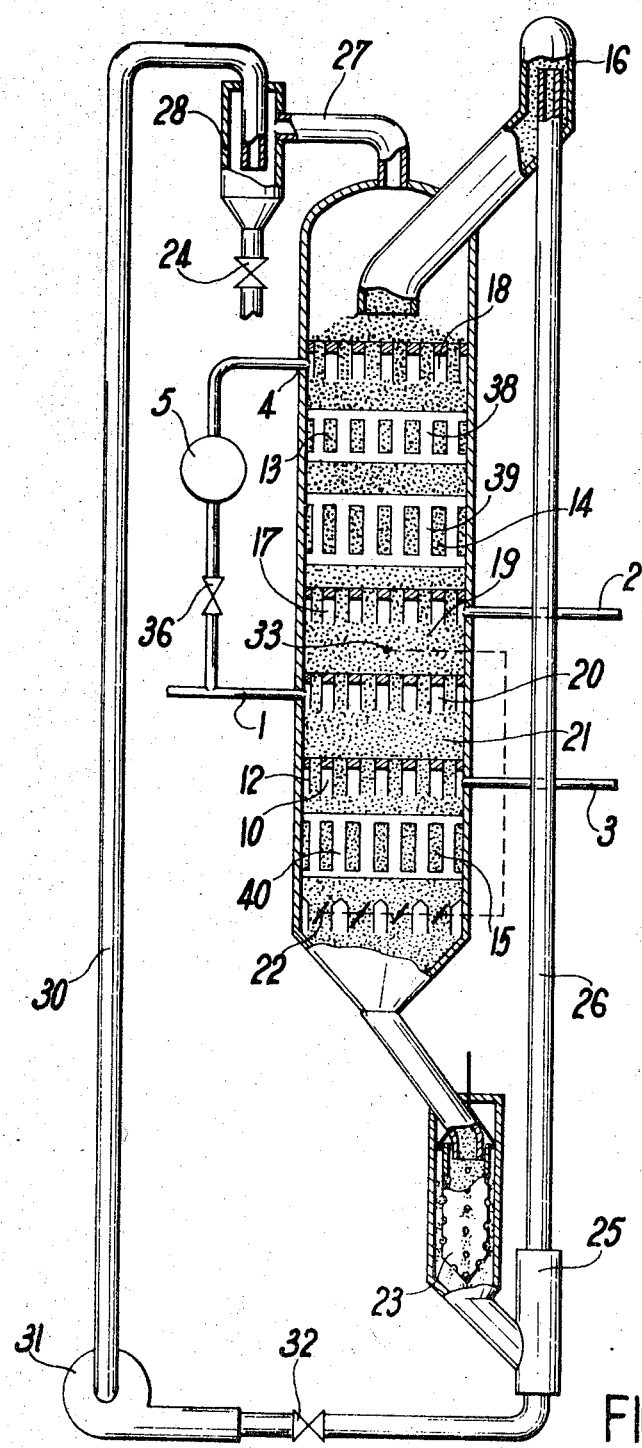
FIG. 2 is a general view of the plant.

There is shown in FIG. 2 a column which is made up of a number of sections welded together. Introductions and withdrawals are carried out by means of plates such as the plate 10 which permit on the one hand the downward motion of the impregnated solid and, on the other hand, the extraction of the gases without entrainment of said solid. The plates are cylindrical and provided with holes having extensions in the form of chimneys such as the chimney 12. As a consequence, the impregnated solid passes into the chimneys and the gas is extracted between the chimneys. Heating and cooling of the solid are carried out by means of tubular heat exchangers 38, 39 and 40 and the cooling or heating fluid is intended to circulate within the heat-exchanger tubes.

In this plant, the mixture to be separated is introduced at 1. The least strongly absorbed gases are withdrawn at 2. The most strongly absorbed gases are withdrawn at 3. The gases which are extracted at 4 are recycled to the inlet by means of an impeller 5 which is controlled by the valve 36. The gases referred-to, which represent only 5 to 10% by volume of the gaseous mixture which is fed in at 1, can be recycled directly to the inlet. The solid which is derived from the separator 16 is admitted into the purge section 13 after having passed through the extraction plates 18. Within the purge section, the temperature of the solid is maintained at a temperature in the vicinity of that of the desorption section. After having passed through the purge zone, the solid passes into the cooling section 14, then passes through the plates 17 from which the least strongly absorbed gases are extracted. The solid then arrives in the depletion section 19 in which it is swept by a gas derived on the one hand from the introduction and on the other hand from the reflux of the desorption section. Gas-liquid exchanges are more or less numerous and the products extracted are of greater or lesser purity according to the height of said desorption section. The solid then passes through the plates 20 in which the mixture to be separated is introduced, then through the enrichment zone 21 in which it is swept by a gas derived from the desorption zone, then through the plates 10 from which the most strongly absorbed gases are extracted, and finally penetrates into the desorption zone 15 in which it is heated, thereby permitting the desorption of the absorbed products.

The solid then passes into a flow regulator 22 which serves to regulate and equalize the flow within the column, then passes into a solid flow-meter 23 and is introduced into the injector of the pneumatic transport unit 25. The gas enters the injector and entrains the impregnated solid which is conveyed through the pipe 26. The gas and the solid are separated within the separator 16. At the top of the column, the pipe 27 extracts the transport gas. Said pipe opens into a cylone 28 which makes it possible by means of the valve 24 to separate-out the fines which might otherwise have been entrained by the transport gas. The outlet of the cylone is connected to the impeller 31 via the pipe 30. The valve 32 serves to regulate the pneumatic transport rate. The flow-distribution regulator 22 is set by the temperature measurement 33 which is located in the depletion section 19. There are placed in each outlet a cyclone and a bank of filters for the extraction of fines which may be entrained.

Figure 3:
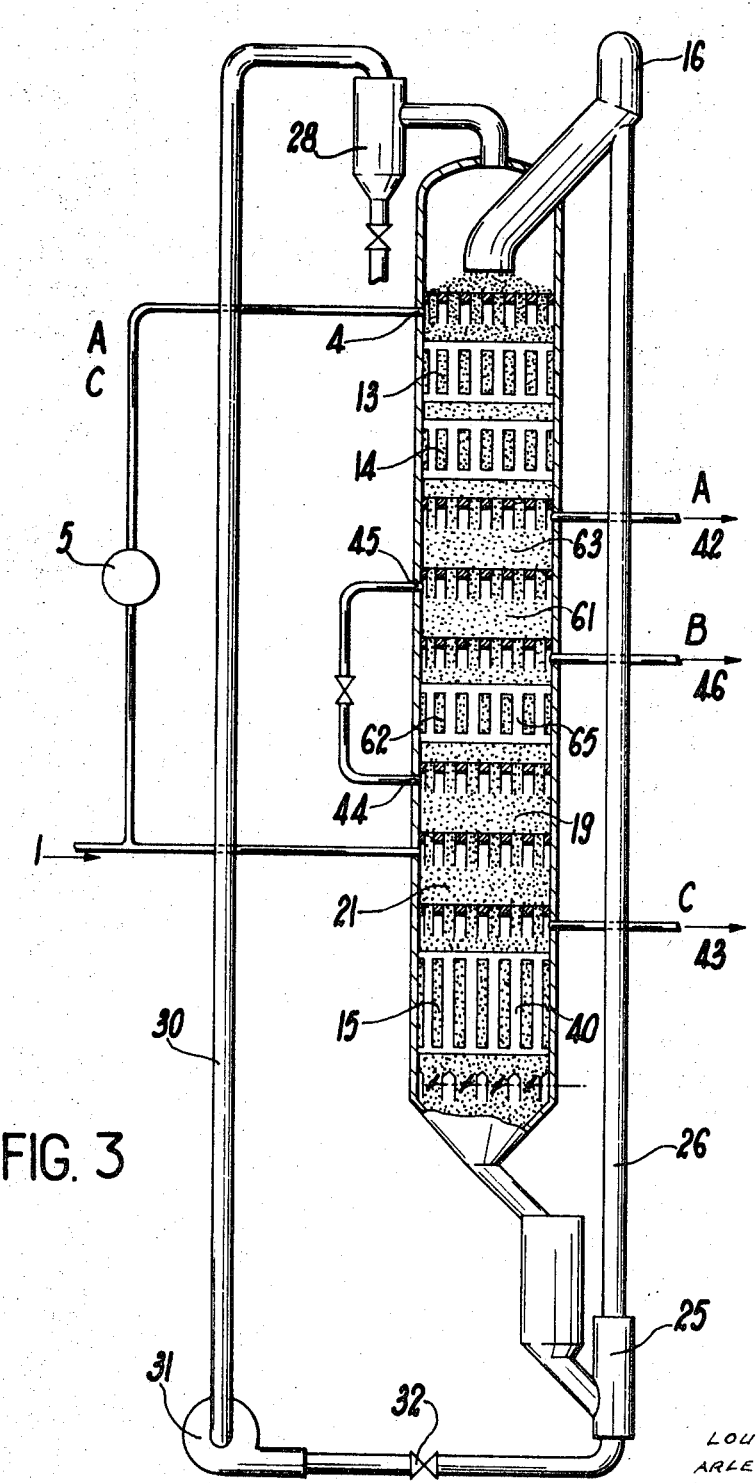
FIG. 3 is a diagrammatic view of a plant for the separation of a ternary gaseous mixture.

In FIG. 3, which represents an installation for the separation of a ternary gaseous mixture ABC, the mixture to be separated is fed into the column through the pipe 1. Separation is carried out as a function of the absorptive capacities with respect to the liquid with which the granular solid is impregnated and of the flow rate of the absorbent phase.

The least strongly absorbed binary mixture AB migrates through the section 19 whilst the constituent C is entrained by the absorbent phase towards the section 21 so as to be desorbed within the section 15 and drawn-off at the top portion of said section at 43.

In order not to mix the reflux of the desorption section 62 with the reflux of the section 19 consisting respectively of the constituents B and AB, the mixture AB is drawn-off at 44 and reintroduced at 45. At this level, the mixture separates into two fractions: the constituent A migrates into the section 63 in which it is drawn off at 42 and the constituent B is entrained towards the sections 61 and 62 in which it is desorbed under the action of heat by means of the tubular heat exchanger 65 in which a heating fluid is circulated, and is drawn-off at 46. The absorbent phase which returns from the pneumatic transport unit contains a small quantity of C which is totally eliminated by a reflux of a fraction of the constituent A through the purge section 13. The gases which pass out at 4 ($A+C$) are recycled to the inlet by means of an impeller 5.

The sections 19 and 21 are maintained at a temperature $T_2$, the sections 61 and 63 at a temperature $T_1$ and the sections 13 and 15 at a temperature $T_3$.

The method according to the invention finds wide application and permits the separation of a gaseous mixture into its different constituents while making use of a single column. The practical advantage of such a process from an economic standpoint can therefore readily be appreciated. In addition to the substantial capital cost savings which are made possible, the separation process takes place in a single temperature cycle, the quantity of heat which is necessary for desorption of the constituents of the gaseous mixture and the quantity of fluid which is necessary for cooling of the impregnated solid are distinctly smaller.

The process referred to above, which employes the absorbent properties of a liquid phase which is present on a solid support and which does not call for the use of any carrier gas has a number of advantages:

separation of gaseous constituents of a mixture which has closely related coefficients of volatility within all concentration ranges, quantitative separation of a gaseous mixture into its different constituents, completion of desorption of the most strongly absorbed constituent as a result of a very small quantity of eluent consisting of a fraction of the most strongly absorbed constituent, enhanced capacity of the column as a result of elimination of the carrier gas, use of a minimum quantity of solvent, separation of substances which are sensitive to heat.

The fact of utilizing the liquid phase on a granular solid support increases the contact surface between liquid and gas, thereby permitting of greater transfer of substance and therefore much lower plate heights.

The process in accordance with the invention permits of purification or separation of substances which have either closely related or equal boiling points. For example, it is possible to purify by means of the process the hydrocarbons of $C_1$ to $C_3$ methane, ethylene, ethane, acetylene, propene, propane, propyne on a solid such as Celite C22 for example, which is impregnated with: triisobutylene, dinonylphthalate, didecylphthalate, dimethylsulfolane.

The hydrocarbons of $C_4$ isobutane, isobutene, 1-butene, 1,3-butadiene, n-butane, trans-2-butene cis-2-butene on a solid such as Celite C22, for example, which is impregnated with: triisobutylene, diisodecylphthalate, dinonylphthalate, dimethylsulfolane, Carbitol.

The hydrocarbons of $C_5$—isopentane, 3-methyl-1-butene, 1,4-pentadiene, isopentane, 1-pentene, 2-methyl-1-butene, isoprene, 2-trans-pentane, 2-cis-pentene, 2-methyl-2-butene cyclopentadiene, piperylene transpiperylene, cis-cyclopentane-cyclopentene on a solid such as Celite C22, for example, which is impregnated with dinonylphthalate, didecylphthalate, tricresylphosphate, Carbitol, hexamethylphosphoramide, dimethylsulfolane, $\beta\beta'$-oxydipropionitrile.

The hexanes—2,2-dimethylbutane, 2,3-dimethylbutane, 2-methylpentane, 3-methylpentane, n-hexane cyclohexane—on a solid such as Celite C22, for example, which is impregnated with "Apiezon A"—squalane, didecylphthalate, dinonylphthalate, tetrahydrofurfurylphthalate, benzyldiphenyl, hexane, 2,5-dione dimethylsulfolane, oxydipropionitrile-polyethylene glycol—the heptanes—2,2-dimethylpentane, 2,4 - dimethylpentane, 2,2,3 - trimethylbutane, 2,4-dimethylpentane, 2,2,3-trimethylbutane, 2,3- and 3,3 - dimethylpentane, 2 - methylhexane, 3-ethylpentane-n-heptane—on a solid such as Celite C22, for example, which is impregnated with squalane, diphenylbenzene, polyethylene glycol-$\beta\beta'$-oxydipropionitrile.

The alcohols such as methanol, ethanol, isopropanol, propanol, n-butanol, terisobutanol, butanol, isopentanol, n-pentanol—etc. on a solid such as Celite C22, for example, which is impregnated with polyethylene glycol 400, the silicone oils tricresyl phosphate, dioctyl sebacate, didecylphthalate, dimethylether of hexamethylene glycol, $\beta\beta'$-oxydipropionitrile.

The octanols such as 2,2,4-trimethyl-4-pentanol, 2,2,4-trimethyl-3-pentanol, 4-methyl-3-heptanol, 2,3,4-trimethyl-3-pentanol, 3-methyl-3-heptanol, 3-ethyl - 4 - hexanol, 4-ethyl-2-hexanol, 2-methyl-5-heptanol, 3-octanol, 2-methyl-1-heptanol, 4-octanol, n-propyl-1-n-pentanol, 2-octanol, 2-ethyl-1-hexanol - 1 - octanol—on a solid such as Celite C22, for example, which is impregnated with polyethylene glycol, for example:

The sterols on a solid such as Celite C22 impregnated with the silicone oils at a temperature of the order of 200°.

The aldehydes and the ketones on a solid such as Celite C22 impregnated with dioctylsebacate, silicone oils, didecylphthalate, $\beta\beta'$-oxydipropionitrile at temperatures of the order of 70 to 100°.

The amines on a solid such as Celite C22, for example, impregnated with paraffin-glycerol "Lubrol MO."

The pyridines and the picolines on a solid such as Celite C22, for example, impregnated with squalane-silicone oils—tricresylphthalate, polyethylene glycol, glycerol. The halogenated compounds (containing chlorine, bromine, iodine, fluorine) of the above-mentioned hydrocarbons on a solid such as Celite C22, for example, which is impregnated with dinonylphthalate, glycerol, silicone oils, paraffin. The sulphur compounds of the above-mentioned hydrocarbons on a solid such as Celite C22, for example, impregnated with mineral oil, paraffin, dinonylphthalate, tricresyl phosphate, $\beta\beta'$-iminodipropionitrile.

The halogenated volatile derivatives of the metals, the chelates, the organo-metallic compounds on a solid which is inert to these products and impregnated with a product which does not react with the compounds to be purified and which, in some cases, can be, for example, either paraffin or squalane.

There will now be described a few examples of application of the separation process according to the invention.

EXAMPLE 1

There was carried out the separation on Celite brick C22 impregnated with dinonylphthalate of a mixture whose composition is given in Table I below, into two compounds having compositions which are given in Tables II and III.

| | Tables | | |
|---|---|---|---|
| | I, percent | II, percent | III, percent |
| Methane | 0.4 | 0.5 | 0 |
| Ethylene | 81.6 | 99.5 | 0 |
| Ethane | 17.6 | 0 | 2.28 |
| Propylene | 0.4 | 0 | 97.72 |

EXAMPLE 2

There was carried out the separation on Celite brick C22 impregnated with dinonylphthalate of a mixture having a composition which is given in Table IV below, into two compounds whose compositions are given in Tables V and VI.

|  | Tables | | |
| --- | --- | --- | --- |
|  | IV, percent | V, percent | VI, percent |
| Ethylene | 1.79 | 5.22 | 9 |
| Ethane | 3.34 | 9.3 | 1 |
| Propylene | 29.35 | 85.48 | 0 |
| Propane | 54.3 | 0 | 82.0 |
| $C_4$ | 11.12 | 0 | 17.0 |

EXAMPLE 3

The separation of a mixture consisting of 70% trans dodecane and 30% cis dedacalin was carried out on Celite C22 impregnated with 5% diethylene glycol-succinate.

There was obtained at the top of the desorption zone 99.9% cis decalin and at the top of the depletion zone 99.9% trans decalin.

EXAMPLE 4

There was carried out the separation of a ternary mixture corresponding to a pair of hydrocarbons at $C_4$ consisting of 30% isobutane, 30% butane and 40% cis-2- and trans-2-butene.

The throughput processed was 3,100 kgs./h. for a throughput of absorbent phase of 80,000 kgs./hour (silica impregnated with 33% dinonylphthalate).

The temperatures $T_1$, $T_2$ and $T_3$ were respectively 15°, 50° and 200° C.

The degrees of purity of the products delivered from the column are recorded in Table I below. The numerals indicate the references of FIG. 3.

TABLE I

| | Mass compositions of the different gas streams, percent. | | | | | |
| --- | --- | --- | --- | --- | --- | --- |
| | (1) | (43) | (44) | (46) | (42) | (4) |
| Constituent A, isobutane | 30 | 0 | 49.4 | 0 | 98.92 | 63. |
| Constituent B, n-butane | 30 | 0.82 | 49.55 | 98.94 | 1.08 | |
| Constituent C, 2-butene | 40 | 99.18 | 1.05 | 1.06 | | 36. |

EXAMPLE 5

There was carried out the separation of a ternary mixture consisting of: 40% ethane, 10% ethylene and 50% propane.

This mixture was separated in a continuous chromatographic column at a pressure of 8 bars and an hourly throughput of 1 ton/h.

The absorbent consisted of Celite C22 impregnated with 20% dimethylsulfolane which was passed downwards in countercurrent flow at a rate of 30 tons/hour.

The temperatures $T_1$ and $T_2$ were 20° C. and the temperature $T_3$ was 80° C.

The impurities of the three outlets are recorded in Table 2 below:

TABLE 2

| Nature of the hydrocarbon | Feed mixture, percent | Top product (42), percent | Intermediate product (46), percent | Bottom product (43), percent |
| --- | --- | --- | --- | --- |
| Ethane | 40 | 99 | 5 | 0 |
| Ethylene | 10 | 1 | 90 | 1 |
| Propane | 50 | 0 | 5 | 99 |

What we claim is:

1. A method of the continuous separation of the constituents of a gaseous mixture, wherein the separation process is carried out by absorption of the constituents by a liquid with which a granular solid is impregnated and serves as a support for said liquid, which comprises circulating the impregnated solid within a column countercurrent to the gaseous mixture to be separated, said gaseous mixture being introduced to said column at an intermediate point of said column, passing the impregnated solid successively through a depletion zone, an enrichment zone, a desorption zone and a purge zone, the desorption of the most strongly absorbed constituents being partially carried out in the desorption zone by heating and completed in the purge zone by elution with a fraction of the constituents which are the least strongly absorbed, recycling to the inlet the fraction of the most strongly absorbed constituents which has been desorbed in the purge zone and the fraction of the least strongly absorbed constituents which has served to desorb the most strongly absorbed constituents in the purge zone, drawing-off at the top of the absorption zone the most strongly absorbed constituents and drawing-off at the top of the depletion zone the least strongly absorbed constituents, the gaseous mixture being separated and the granular solid being the sole constituents being passed through the column, said gaseous mixture being selected from the group consisting of (a) methane, ethylene, ethane, acetylene, propene, and propane; (b) isobutane, isobutene, 1-butene, 1,3-butadiene, n-butane, trans-2-butene and cis-2-butene; (c) isopentane, 3-methyl-1-butene, 1,4-pentadiene, isopentane, 1-pentene, 2-methyl-1-butene, isoprene, 2-transpentane, 2-cis-pentene, 2-methyl-2-butene, cyclopentadiene, piperylene, transpiperylene, cis-cyclopentane and cyclopentene; (d) 2,2-dimethylbutane, 2,3-dimethylbutane, 2-methylpentane, 3-methylpentane, n-hexane and cyclohexane; (e) 2,2-dimethylpentane, 2,4-dimethylpentane, 2,2,3-trimethylbutane, 2,4-dimethylpentane, 2,2,3-trimethylbutane, 2,3-dimethylpentane, 3,3-dimethylpentane, 2-methylhexane, 3-ethylpentane and n-heptane; (f) trans-dodecane and cis-dedecalin; (g) methanol, ethanol, isopropanol, propanol, n-butanol, terisobutanol, butanol, isopentanol and n-pentanol; (h) 2,2,4-trimethyl-4-pentanol, 2,2,4-trimethyl-3-pentanol, 4-methyl-3-heptanol, 2,3,4-trimethyl-3-pentanol, 3-methyl-3-heptanol, 3-ethyl-4-hexanol, 4 - ethyl - 2 - hexanol, 2-methyl-5-heptanol, 3-octanol, 2-methyl-1-heptanol, 4-octanol, n-propyl-1n-pentanol, 2-octanol, 2-ethyl-1-hexanol and 1-octanol; (i) sterols; (j) aldehydes and ketones; (k) amines; (l) pyridines and picolines; (m) the halogenated compounds of (a), (b), (c), (d), (e) and (f) and (n) the sulfur compounds of (a), (b), (c), (d), (e) and (f); and said liquid being selected, respectively, from the group consisting of (a) triisobutylene, dinonylphthalate, didecylphthalate, and dimethyl sulfolane; (b) triisobutylene, diisodecylphthalate, dinonylphthalate, dimethylsulfolane and Carbitol; (c) dinonylphthalate, didecylphthalate, tricresylphosphate, Carbitol, hexamethylphosphoramide, dimetylsulfolane and $\beta,\beta'$-oxydipropionitrile; (d) Apiezon A, squalane, didecylphthalate, dinonylphthalate, tetrahydrofurfurylphthalate, benzyldiphenyl, hexane, 2,5-dione dimethylsulfolane, oxydipropionitrile and polyethylene glycol; (e) squalane, diphenylbenzene, polyethylene glycol and $\beta\beta'$-oxydipropionitrile; (f) diethylene glycol succinate; (g) polyethylene glycol 400, silicone oils, tricresyl phosphate, dioctyl sebacate, didecylphthalate, dimethylether of hexamethylene glycol and $\beta\beta'$ - oxydipropionitrile; (h) polyethylene glycol; (i) silicone oils; (j) dioctylsebacate, silicone oils, didecylphthalate and $\beta\beta'$-oxydipropionitrile; (k) paraffin, glycerol; (l) squalane, silicone oils, tricresylphthalate; polyethylene glycol, and glycerol; (m) dinonylphthalate, glycerol, silicone oils and paraffin; and (n) mineral oil, paraffin, dinonylphthalate, tricresyl phosphate, and $\beta\beta'$-iminodipropionitrile.

2. The method in accordance with claim 1 for the separation of a gaseous mixture containing $n$ constituents wherein the liquid with which the solid is impregnated has a progressively increasing absorption capacity from the first to the $n$th constituent, which comprises continuously feeding said mixture at an intermediate point of a column which is filled with a granular solid impregnated with a liquid, said solid being circulated within said column countercurrent to the gas beng separated, passing the impregnated solid successively through depletion, enrichment, desorption and purge zones, collecting the $n$th constituent which is the most strongly absorbed constituent at the top of a first desorption zone located at the lower end of the column and collecting the $(n-1)$ constituent in a second desorption zone located above a first depletion zone, withdrawing the $(n-1)$ constituent together with the other constituents of the gaseous mixture at a point in the column which is located at a level below the point of withdrawal of the $(n-1)$ constituent and reintroducing said constituent at a level above said withdrawal point at which point is carried out the separation between the $(n-1)$ constituent which is carried downwards and the other constituents which migrate upwards, recovering the $(n-2)$ constituent at a point located above the level at which the gases collected in the depletion zone have been reintroduced, repeating the operations of withdrawal and collection of the partially separated gases a number of times corresponding to the number of constituents to be separated, recovering the least strongly absorbed constituent of the gaseous mixture from the uppermost portion of the last depletion zone, and completing the desorption of the most strongly absorbed constituent in the purge zone by a fraction of the least strongly absorbed constituent which is recycled to the inlet of the column.

3. The method of claim 1 wherein the gas mixture to be separated is a hydrocarbon gas mixture containing methane, ethylene, ethane and propylene which is selectively absorbed by dinonylphthalate.

4. The method of claim 1 wherein the gas mixture to be separated is a hydrocarbon gas mixture containing ethylene, ethane, propylene, propane and butane which is selectively absorbed by dinonylphthalate.

5. The method of claim 1 wherein the gas mixture to be separated is a hydrocarbon gas mixture containing trans-dodecane and cis-dedecalin which is selectively absorbed by diethylene glycol succinate.

6. The method of claim 1 wherein the gas mixture to be separated is a hydrocarbon gas mixture containing isobutane, butane, a cis-2-butene and trans-2-butene which is selectively absorbed by dinonylphthalate.

7. The method of claim 1 wherein the gas mixture to be separated is a hydrocarbon gas mixture containing ethane, ethylene and propane which is selectively absorbed by dimethylsulfolane.

References Cited
UNITED STATES PATENTS

| 2,583,352 | 1/1952 | Berg | 55—60 |
| 3,338,031 | 8/1967 | Barker et al. | 55—67 |

JAMES L. DE CESARE, Primary Examiner

U.S. Cl. X.R.

55—67